United States Patent [19]

Borgese

[11] 4,063,820
[45] Dec. 20, 1977

[54] APPARATUS FOR MEASURING A DIMENSION OF AN OBJECT

[75] Inventor: William Anthony Borgese, Willingboro, N.J.

[73] Assignee: RCA Corporation, New York, N.Y.

[21] Appl. No.: 630,649

[22] Filed: Nov. 10, 1975

[51] Int. Cl.$^2$ ............................................... G01B 11/04
[52] U.S. Cl. ................................. 356/167; 250/223 R; 250/224; 250/560
[58] Field of Search ............................... 356/158–160, 356/163, 167, 1, 156, 157; 250/223 R, 223 B, 224, 559–561, 222 R

[56] References Cited

U.S. PATENT DOCUMENTS

| 3,487,226 | 12/1969 | Yetter et al. | 250/222 R |
| 3,806,253 | 4/1974 | Denton | 356/157 |

FOREIGN PATENT DOCUMENTS

| 747,558 | 4/1956 | United Kingdom | 250/223 R |
| 804,161 | 11/1958 | United Kingdom | 250/223 B |
| 227,599 | 2/1969 | U.S.S.R. | 356/167 |

OTHER PUBLICATIONS

Pirlet, R., "Measuring of Dimensions of Rolled Products" Conf. Proc. of the International Conf. on Iron & Steel Making, Dusseldorf, Germany, 16–18 Apr. 1970, pp. 31–37.
Pirlet et al., "TV/Laser System Gages Steel Slab Thickness", Instrumentation Technology, 6-1969, pp. 43–47.

*Primary Examiner*—John K. Corbin
*Assistant Examiner*—Wm. H. Punter
*Attorney, Agent, or Firm*—H. Christoffersen; Joseph D. Lazar; Raymond E. Smiley

[57] ABSTRACT

A beam of light angularly directed relative to a surface of an object having a dimension to be measured is intercepted by the object, which is moving at a known speed. By knowing the beam angle, the object speed, and the time lapse between the passage of the object past a reference point and the point of beam interception, the dimension of the object is readily determined.

2 Claims, 2 Drawing Figures

APPARATUS FOR MEASURING A DIMENSION OF AN OBJECT

Background of the Invention

The invention herein described was made in the course of or under a contract with the United States Postal Service.

It is often desirable to know the dimensions of an object of the type known as a right parallelepiped for any of a number of reasons. One such method to measure the height of an object positioned on a reference surface is to employ a series of parallel light rays and a like series of reception photodiodes, one for each light ray. The object to be measured is moved along the reference surface between the light sources and the photodiodes. By determining the number of photodiodes to which light is interrupted, the dimension of the object may be determined. Such a system requires complex and costly equipment to create the parallel light rays and a plurality of photodiodes and related electronics, which is also costly.

SUMMARY OF THE INVENTION

The present invention requires only a single source producing an electromagnetic wave beam and $\mu\beta$ receiving means, between which the object is moved, the beam being angled relative to the surface of the object having the dimension to be measured. A reference means positioned ahead of the beam in the direction of object movement detects the passage of the object. A means for determining the time lapse between passage of the package past the reference means until it interrupts the beam, determines in effect the height of the object.

DETAILED DESCRIPTION

Figures 1, 2:
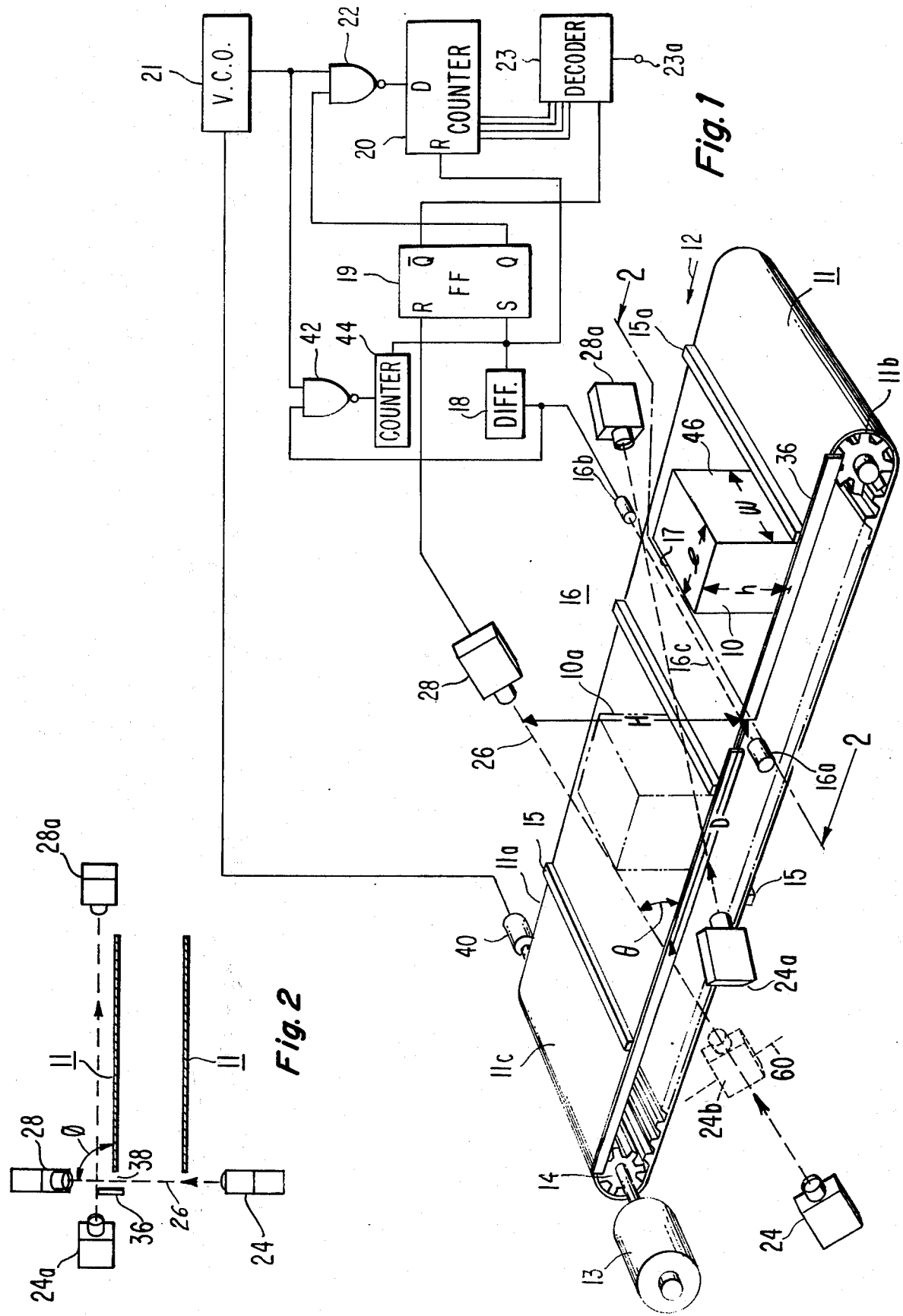
FIG. 1 is a package measuring apparatus in mechanical and electrical schematic form constructed in accordance with one embodiment of the present invention.
FIG. 2 is a cross section along lines 2—2 of FIG. 1 illustrating certain portions of the mechanical apparatus in more detail.

Referring now to FIG. 1, legend 10 represents a right parallelepiped package, the width ($w$) and/or height ($h$) of which is (are) to be measured. Apparatus for measuring the height ($h$) of the pacakge will be described in detail, but sufficient information will be disclosed at the end of this section to enable one to measure the width ($w$) and length ($l$). Package 10 rests on a means for moving the package such as a toothed conveyer belt 11. The surface of the conveyer 11 legended 11c, nearest arrow 12, is caused to move in the direction of arrow 12 by a motor 13, driving a toothed wheel 14 over which conveyer 11 passes. Motor 13 is ideally but not necessarily adapted to drive conveyer 11 (and therefore package 10) at a known constant speed.

To insure that package 10 (and other packages also on the conveyer but not shown) does not slip relative to the conveyer, cleats 15 may be provided. Note that package 10 is residing against cleat 15a. Further, conveyer 11 may be tipped so that edge 11a is elevated above edge 11b. Thus, package 10 is urged against guide 36, which is positioned beyond and parallel to edge 11b, such as to form a gap 38 (See FIG. 2), the purpose of which will be explained shortly.

A reference means assembly 16 comprising for example a light source 16a producing a collimated beam 16c and a light responsive transducer 16b are positioned along conveyer 11, orthogonal to the direction of travel of the conveyer at a convenient location to be intercepted by the leading surface 17 of package 10. Light responsive transducer 16b is coupled to a differentiator 18, which is adapted to produce a momentary pulse at its output terminal when the leading surface 17 of package 10 passes the reference means assembly 16. Some portion of beam 16c must be located sufficiently close to surface 11c of conveyer 11 so as to be triggered by any package 10 regardless of its height $h$ is and width $w$. If the expected minimum height $h$ is less than the height of cleats 15, logic additional to that described will be necessary to in effect ignore interruptions caused by the passage of cleats 15 past reference means 16. Such additional logic may be easily designed, since cleats 15 may be spaced at regular intervals and since the speed of conveyer 11 is known.

The output terminal of differentiator 18 is coupled to the set (S) terminal of a flip-flop 19 and a reset (R) terminal of a counter 20, which is preferably of the decrementing type.

The output terminal of a source 21 of spaced clock pulses and the Q output terminal of flip-flop 19 are coupled respectively to first and second input terminals of a NAND gate 22. If conveyer 11 can be made to move at a constant speed, then pulses source 21 may be of the type that produces uniformly spaced pulses. If the conveyer does not move at a constant speed, then source 21 must be of the type which produces a varying output frequency in response to a varying input signal. Thus, for example, as illustrated in FIG. 1, source 21 may be a voltage controlled oscillator and there may be additionally supplied a device 40 mechanically attached to toothed drive wheel 14, which produces a voltage corresponding to the speed of the conveyer. This device, which may be a tachometer generator, is coupled to the control terminal of source 21 to control the frequency of its output pulses. Alternatively, device 40 may be adapted to produce pulses directly corresponding to movement of conveyer 11 and may be coupled directly to NAND gate 22 in place of source 21.

The output terminal of NAND gate 22 is coupled to the decrementing (D) terminal of counter 20. By means of this arrangement, counter 20 in effect becomes a timer, decrementing by a count of one each time clock 21 produces a pulse (provided the flip-flop 19 is set), which occurs when conveyer 11 moves a given incremental distance. Since flip-flop 19 is set by the passage of surface 17, past reference means 16, the count in counter 20 is in effect a measure of the time since passage of surface 17 past the reference means.

The output terminals of counter 20 are coupled to a decoder 23. The Q terminal of flip-flop 19 is coupled to a control terminal of decoder 23. The arrangement of decoder 23 is such that the decoded value of counter 20 is available at its output terminal 23a whenever flip-flop 19 is reset by means to be described shortly.

A suitable source 24 for transmitting a collimated beam of electromagnetic wave energy is positioned such as to project a beam 26 in a plane which passes through slot 38, and is generally normal to cleats 15. The beam is angled at an angle $\theta$ to surface 11c of conveyer 11 toward surface 17 having the dimension $h$ to be measured. Means 24 may, for example, be a laser or a light source and lens combination. Since package 10 is inclined toward guide 36, the beam 26 will be in the path taken by the package. The only requirement for the positioning of beam source 24 is that beam 26 strike the upper edge 17 of a package 10 as it moves in the direction of arrow 12. Thus, if only relatively low and wide packages (i.e. large dimension w, small dimension h) are expected to be measured by the system, the beam may be angled relative to cleats 15 such that angle $\phi$, FIG. 2, is less than 90°. Conversely, if relatively tall and narrow packages are to be measured (i.e., large dimension h, small dimension w) angle $\phi$ must be nearly 90°.

The location of source 24 will also depend to a large extent on the sizes of expected packages in the system. If, for example, only relatively long packages are expected, source 24 may be placed at the left end of the conveyer (as illustrated in FIG. 1) and a second conveyor slide or other receiving device may be positioned beyond source 24 to receive the packages. Alternatively, if only relatively wide packages are contemplated, conveyor 11 may be divided longitudinally into two parts forming a slot between them through which beam 26 may be passed. A beam receiving means 28 such as a transducer responsive to signals emitted by source 24 is positioned above the highest package 10 expected to receive energy from beam 26 in the absence of interception by package 10. Transducer 28 is coupled to the reset (R) terminal of flip-flop 19.

Angle $\theta$, the angle between beam 26 and surface 11c, is somewhat arbitrary. Small angles $\theta$ will provide more accuracy of measurement for any given clock frequency. Larger angles $\theta$ will allow a shorter length dimension of conveyor 11. Regardless of the angle $\theta$, it is essential that beam 26 be at least a distance H above conveyor 11c at a point orthogonal to conveyor surface 11c above light beam path 16c, where H is the maximum height of a package to be measured.

In operation, when the dimension h of a package 10 is to be measured, the package resting on conveyor 11 is propelled in direction 12 by conveyor 11 driven by motor 13. The motor will be assumed to move the conveyor at a constant surface speed S length units/time unit, by way of example 10 mm/second. When surface 17 of package 10 arrives at reference means 16, beam 16c is broken, causing differentiator 18 to produce a momentary pulse. This momentary pulse sets flip-flop 19 (previously assumed to be reset) and resets counter 20 to some fixed value K, where k = C.T, and where C is the number of clock pulses per time unit and where T is the time required for a package to pass from reference means 16 to the point of intersection 26a of beam 26 with conveyer surface 11c. The latter is, of course, a function of the speed of the conveyer. By way of example, assume $\theta$ = 45° and H = 180 mm, therefore, D = H = 180 mm (this follows since tan 45° = H ÷ D = 1) and T = H ÷ S = 180 ÷ 10 = 18 seconds. The clock rate can be set to any desired value, but it is desirable to select a value which directly relates to the package height in some convenient units, such as millimeters. Assuming the example thus far given, C may be 10 pulses/second, and thus K = C · T = 10 · 18 = 180. Therefore, as the package moves each 1 mm which occurs in 0.1 seconds, counter 20 is decremented by 1.

Assuming a package height of 80 mm (a value to be determined), and further assuming that the package remains stationery relative to the conveyer, the package will intercept beam 26 as indicated by package 10a illustrated in phantom after it is moved 100 mm and thus is 80 mm from the point of intersection of beam 26 and the extension of conveyor surface 11c. Such a move will be completed in 10 seconds and counter 22 will be at a count of 80 = 180 − (10 cts./sec. · 10 sec.). When beam 26 is intercepted, transducer 28 will send a pulse to reset flip-flop 19. The resultant signal from terminal Q will disable NAND gate 22 so that the count in counter 20 remains frozen. Concurrently, the signal at terminal Q enables decoder 23 to produce a signal indicating a count of 80, which corresponds to a package height of 80 mm.

Clearly, the numeric values given are by way of example only. The actual values will be determined by the dictates of the specific situation. Further, the apparatus just described may be used to measure the dimension w on package 10 so long as the package rests against a reference surface 36. This is accomplished by positioning a beam transmitter 24a and a beam receiver 28a such that the resulting beam 26a is generally parallel to surface 11c and not above the lowest height package expected. Further, beam 26a must cross beam 16c at a point distant from guide 36, which is not closer than the widest package expected. Logic similar to elements 18–22 will be employed to determine dimension W in a manner similar to that described in connection with the determination of height h.

With additional logic elements, length 1 may also be determined. If such dimension is desired, the output terminals of transducer 16b and source 21 are coupled to respective terminals of additional NAND gate 42. The output terminal of NAND gate 42 is coupled to the input terminal of an additional counter 44 of the incrementing type. The output terminal of differentiator 18 is coupled to the reset terminal of counter 44. In operation, as the leading edge of the package 10 passes reference means 16, the resultant pulse from differentiator 18 resets the counter to zero. The signal from transducer 16b as a result of beam interception primes NAND gate 42 permitting counter 44 to count each pulse from source 21. When the trailing edge of package 10 (that edge containing surface 46) passes reference means 16, NAND gate 42 will be again blocked by the nature of the signal from transducer 16 and counter 44 will contain a count the value of which represents length 1.

If it is not desired to measure length 1 and width w in the manner just described, packages may be placed on conveyor 11 askew relative to directions along and across the conveyor, eliminating the needs for guides 15. In this case, beam 26 must be arranged to scan across the width of package 10 elevated at angle $\mu$. A scanning mirror may be employed for that purpose which operates such as elements 52, 54, FIG. 3 of U.S. Pat. No. 3,864,548, issued Feb. 4, 1975 to J. T. O'Neil, Jr. et al, and assigned to the common assignee. Alternatively a collinated beam source 24b (illustrated in phantom) identical to source 24 may be provided which is adapted to be pivoted about an axis 60. Then, a plane detector is substituted for element 28. This may be a plurality of photodiodes arranged to produce a pulse to reset flip-flop 19 whenever any photodiode is interrupted. Alternately, a commercially available position detector such as model LSC/9 made by United Detector Technology may be used with either type pickup, the first edge to break beam 16c also breaking beam 26.

While the conveyor 11 has been described as moving in the direction of arrow 12, it may be caused to move in the opposite direction if conditions warrant it. Then, the output terminal of transducer 28 would be coupled to differentiator 18, while the output terminal of transducer 16b would be coupled to the R terminal of flip-flop 19. Then, when package 10 is moved beyond beam 26 (moving from left to right in FIG. 1), so that the beam strikes transducer 28, the resultant signal would reset counter 20 and set flip-flop 19 to begin counting. Likewise, when the package passes beyond beam 16c, the resultant signal from transducer 16b would reset the flip-flop and stop the count.

What is claimed is:

1. Apparatus for measuring the height dimension of a linearly moving right parallelepiped object positioned oblique relative to its direction of movement, where said dimension is in a direction normal to the direction of movement and said movement is at a known velocity, comprising in combination,
   means for directing a narrow beam of electromagnetic wave energy at an acute angle relative to the direction of said dimension and for scanning said beam back and forth in a plane which forms said acute angle said beam being oriented such that is is intercepted by said object during the course of its movement;
   transducer means positioned to sense said beam for producing a signal indicative of any interruption of said beam by said object;
   reference means positioned to detect an edge of said object having said dimension to produce a signal indicative thereof; and
   timing means responsive to said edge detecting signal and to said transducer signal for producing a further signal the characteristic of which is determined by the time lapse between the two received signals which time lapse corresponds directly to said height dimension to be measured.

2. Apparatus for measuring the height dimension of a linearly moving right parallelepiped object, where said dimension is in a direction normal to the direction of movement and said movement is at a known velocity, comprising in combination;
   means directing a narrow beam of electromagnetic wave energy at an acute angle relative to the direction of said dimension;
   said beam being oriented such that it is intercepted by said object during the course of its movement;
   transducer means positioned to sense said beam for producing a signal indicative of interruption of said beam by said object;
   reference means positioned to detect an edge of said object having said dimension to produce a signal indicative thereof;
   timing means comprising a source of spaced pulses synchronized to the speed of movement of said object and a decrementing counter means receptive of said spaced pulses and responsive to said edge detecting signal and to said transducer signal for counting spaced pulses received between the time said transducer means signal and said reference means signal are received, the resultant count in said counter means being related to said height dimension of said object; and
   means for initializing said counter to a value which corresponds to the number of spaced pulses occurring between the time said edge detecting signal is received by said counter to begin its count and the time an object having said height dimension equal to zero interrupts said beam and stops said counter from counting whereby a larger dimensioned object stops said counter relatively earlier while containing a relatively larger count than a smaller dimensioned object which stops said counter later when it contains a relatively smaller count.

* * * * *